(12) United States Patent
Taipale

(10) Patent No.: US 7,224,266 B2
(45) Date of Patent: May 29, 2007

(54) METHOD FOR IDENTIFYING AND CONTROLLING A VEHICLE DRIVER

(75) Inventor: Asko Taipale, Tampere (FI)

(73) Assignee: Taipale Telematics Oy, Pirkkala (FI)

( * ) Notice: Subject to any disclaimer, the term of this patent is extended or adjusted under 35 U.S.C. 154(b) by 168 days.

(21) Appl. No.: 10/510,133

(22) PCT Filed: Apr. 7, 2003

(86) PCT No.: PCT/FI03/00260

§ 371 (c)(1), (2), (4) Date: Oct. 4, 2004

(87) PCT Pub. No.: WO03/084787

PCT Pub. Date: Oct. 16, 2003

(65) Prior Publication Data

US 2005/0222730 A1    Oct. 6, 2005

(30) Foreign Application Priority Data

Apr. 5, 2002    (FI)    ................................. 20020653

(51) Int. Cl.
*B60Q 1/00*    (2006.01)

(52) U.S. Cl. ...................... 340/439; 340/639; 340/475; 701/36; 701/102; 307/10.4; 307/10.2

(58) Field of Classification Search ................ 340/439, 340/639, 575, 576, 438, 475; 701/1, 36, 701/29, 35, 102; 307/10.4, 10.5, 10.2, 10.3
See application file for complete search history.

(56) References Cited

U.S. PATENT DOCUMENTS

| | | | |
|---|---|---|---|
| 4,477,874 A * | 10/1984 | Ikuta et al. | 701/49 |
| 5,465,079 A | 11/1995 | Bouchard et al. | |
| 5,491,635 A * | 2/1996 | Foeldi et al. | 701/113 |
| 5,570,087 A | 10/1996 | Lemelson | |
| 6,229,908 B1 * | 5/2001 | Edmonds et al. | 382/124 |
| 6,253,139 B1 * | 6/2001 | Borodani et al. | 701/55 |
| 6,310,542 B1 | 10/2001 | Gehlot | |
| 6,957,142 B2 * | 10/2005 | Entenmann | 701/117 |

FOREIGN PATENT DOCUMENTS

DE    10064469    6/2002
GB    2366062 A    2/2002

* cited by examiner

*Primary Examiner*—Daniel Wu
*Assistant Examiner*—Daniel Previl
(74) *Attorney, Agent, or Firm*—Stites & Harbison PLLC; Douglas E. Jackson

(57) ABSTRACT

A method to identify a person driving a vehicle and his/hers driving style, and also to switch on the vehicle either to a driving-allowing mode or to a drive-stop mode, is provided. In the method, the vehicle includes a scanner, and the driver is provided with a data-containing card or object. According to the method, the driving style information of the driver is stored on the card or object, and on starting driving the driver inserts the card or object into the vehicle scanner. Thereafter, data received from selected vehicle controls and/or data from varying information-collecting detectors is compared with information stored on the driver's driving style card, and on basis of the comparison the control unit in the vehicle either allows driving or enters a drive-stop mode.

19 Claims, 1 Drawing Sheet

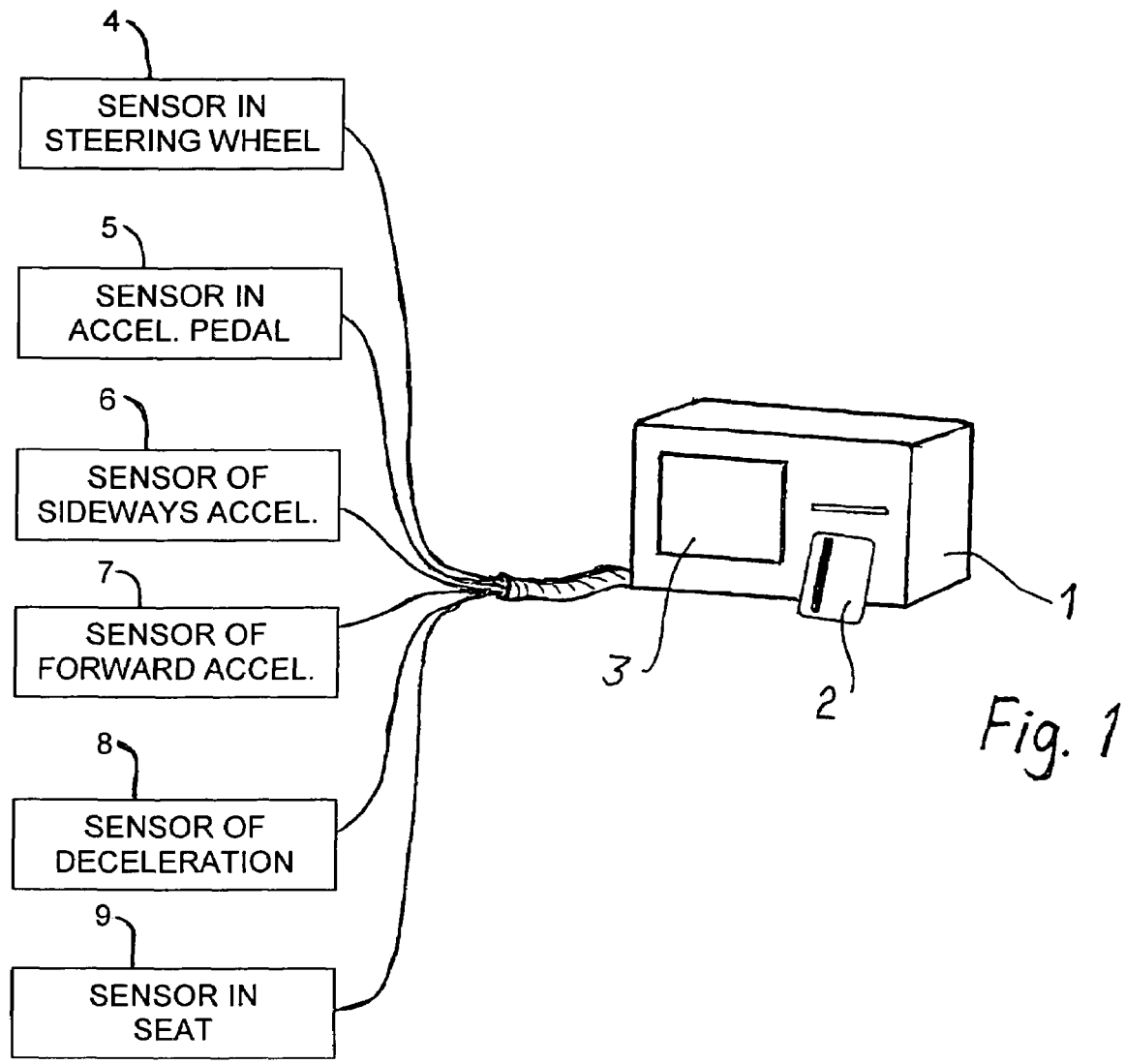

METHOD FOR IDENTIFYING AND CONTROLLING A VEHICLE DRIVER

The invention relates to a method for identifying a person driving a vehicle and for observing his/hers driving style and also to switch on the vehicle either to driving-allowing mode or to drive-stop mode, whereby the vehicle comprises a code, a card or a similar object containing data, or for instance, a scanner of driver's finger or another part of his/hers body and a control unit, and the driver is provided with a personal code or a card containing said data or with a corresponding identification means, as the finger for instance.

Previously known as a drive-stop device is, among other things, the driver-testing alcometer, into which the driver must blow on starting driving. Such an arrangement is not fully reliable, since it is possible that blowing is done by somebody else. This arrangement does not pay regard to other driving disturbing and driving endangering characteristics of the person, as stupor, fatigue, agitation or that the person wants to drive without driving license.

By means of the method as per the invention it is possible to observe and to notice surprisingly during driving the deviations of driver from his/hers normal driving style stored on driver's card or object, and thus it is possible by means of equipment in the vehicle either allow or to stop driving. The method to identify a person driving a vehicle as per the invention is characterized in that in the method information of the driving style of the driver is stored on said card or object or to a data-collecting unit in the vehicle and on start the driver inserts said card or object into the scanner in the vehicle, whereby data, received from selected devices of the vehicle and/or from different information-collecting detectors, is compared with the driving type information stored on driver's card, and on basis of the comparison the control unit in the vehicle either allows driving or gives information of drive-stop or similar other consequences.

The method to observe a person driving a vehicle as per the invention is characterized in that in the method information of the driving style of the driver is stored in said card or object or to a data-collecting unit in the vehicle, and on start, the driver inserts said card or object into the scanner in the vehicle, or gives other identification, as a code, finger identification or similar to said scanner in the vehicle, whereby data, received from selected devices of the vehicle and/or from different information-collecting detectors, is collected on the driver's card or on the information-collecting unit in the vehicle.

The intention with the invention is to create an observing and stopping system in connection with driving a vehicle, according to which system driving is possible only by a personal card or a corresponding object or similar to be placed in the vehicle, and drive-stop possible also during driving, if there is something in the driver's driving style deviating from the normal. The system also excludes replacement of driver by another person, who does not have a card giving right to driving. By means of the invention also the driver's driving type and especially the treatment of the vehicle can be controlled as well as passengers' feelings due to driving style or forces and motions directed on the load in a lorry.

In the following the invention is disclosed with reference to the enclosed drawing, where in FIG. 1 a system according to the invention is shown diagrammatically.

According to the invention into the vehicle a card-reading device 1 is placed, which most suitably includes at the same time a control centre for the system. Everyone, who intends to drive the vehicle, must have a personal card 2, on which driving type information of the person in question is stored. For instance, said information can also be stored in an object like a key. Control centre 1 has a display 3, from which the driver can get instructions and also information how the system will switch on drive-stop. As driving type information data is transmitted from detectors to control centre 1 by means of cables, which are, for instance, in connection with steering wheel 4, from which information is received regarding steering wheel handling, from accelerator pedal 5 regarding the use of gas, acceleration values from different directions, sideways acceleration 6, forward acceleration 7 and deceleration 8 and detector 9 can, for instance, also be in the seat giving information of sitting behaviour. By means of acceleration detectors information is also received of an accident, as a collision resulting in stopping.

In vehicle controls and other suitable places that can come into question detectors or corresponding scanners are placed to send to the control centre information of the function of said devices. The control centre is arranged to compare continuously information from detectors with driving type information read from the driver's card. Experimentally, limits can be determined when the driving type difference exceeds such a limit that the driver can be reckoned to deviate from his/hers normal driving type. When a limit of this kind is exceeded, then the system starts to inform of coming drive-stop and that one has to get ready for it. The system switches on the drive-stop if the driving type does not turn to normal. For instance, in this case it can be the question of fatigue, which the system observed, and hereby the system forces the driver to rest.

The system includes a time of precaution that the system maintains for the same driver, if he/she tries to start driving too soon, when the vehicle has been stopped by drive-stop. Due to fatigue the precaution time can last from ½ to 2 hours. Due to identified drunkenness, the time of precaution ought to be longer. Most probably it is possible by means of the system to separate fatigue from drunkenness and to regulate the time of precaution accordingly.

Of course, the driver's state of being drugged or drunken gives alarm almost at once on starting to drive, since then the driver is not capable to manage driving as stored in the personal card.

If the road conditions cause change of the driving style, there is in the vehicle identification of road conditions, as detection of road conditions due to skidding of wheels. In addition, measuring of outside temperature gives additional information of road conditions. Then the control centre pays regard to the change of driving type into more cautious direction and accepts the driving style changed in this way.

Because, over the years, there is gradual changing of driving style of the person, the system can be modified in the long run, to change, the driving style information of the person into better observation of both driving style and gradual changes in it. The system is thus applicable to store on the card of the person in question information changing in the long run, and thus the card information is kept updated.

When vehicles are furnished with this system, anybody possessing a personal card can go for a drive with any kind of vehicle by inserting the card into the card-reader. Of course, the vehicle must be legally handed over, as keys to the door and to the ignition lock. It is easy to add to the system a function that only certain personal cards are restricted by which the vehicle can be usually driven. The data of these cards is stored in the control centre.

There are situations, where the driving type is not normal and the system as per the invention starts to inform eventual drive-stop. It can then be, for instance, the question of emergency far away from built-up area, the driver drives contrary to his/hers normal driving style and it is a must to carry out transport. Then switch-on of drive-stop could be dangerous. For such a case, the system can, for instance, include a function that driving is possible with warning blinkers on and alarm signal in proper use. However, it is also a disadvantage, for instance, that a police escaping person is able to drive in this way as well as a drunk.

In one embodiment it is possible for the driver to pass the drive-stop in taking wireless connection to an authority and asking the authority to make the passing of drive-stop, for instance by means of a wireless signal, or that the authority gives the driver the key code over phone, the input of which into the control unit deletes the drive-stop. This is applicable in a situation of emergency, whereat the authority also knows who the driver is and his/hers whereabouts. Location of vehicle takes place also at the same time on basis of location by means of known telephone connection or that the unit centre sends the authorities location co-ordinates (GPS) during the telephone connection.

It is possible to arrange wireless connection from vehicles. For instance to the Vehicle Administrative Centre, whereat the police, for instance, becomes information of who is driving the vehicle. It is the possible to arrange for the police a possibility to stop the vehicle travel without chase, sending a signal of drive-stop to the vehicle. One possibility is also that always before starting driving the validity of the driving licence is checked from the Administrative Centre of Vehicles.

To the control centre in the vehicle a function can be arranged to give alarm without driver's functions to a place agreed beforehand, for instance in case the driver gets into an accident, collision with an elk or similar (acceleration detectors indicate). Thus, for instance, information of accidents at night time will be transmitted swiftly and help will get to the scene fast enough.

A control unit as per the invention is furnished with a location system utilizing, for instance, mobile phone techniques. Information of a possible accident will be received quickly.

The validity of driving licence according to the invention can also be restricted by remote control with a signal from the authorities.

In another embodiment the system can be applied to observation of driver's driving style and especially to observe how he/she treats the vehicle. By means of detectors arranged in the vehicle data of driver's functions are received. Detectors are arranged in necessary devices, such as clutch, accelerator pedal, steering wheel and, furthermore, in acceleration detectors to measure accelerations in three directions, for instance. By means of the method it is possible to observe how a buss driver works and thus his/hers suitability for the occupation. Afterwards the driving functions are registered for control. Single, abnormal functions can be eliminated and long period functions observed in general, whereat the actual driving culture of the driver can be examined.

By means of detectors placed in the cabin the passenger feelings in the car are found out just as forces directed on the load in a lorry by means of detectors arranged in the cargo space. In the apparatus an action light can be mounted for the driver informing him/her of excessive swerve or acceleration. In this way the driving style of the driver could be influenced. Also the consumption value of fuel, momentary or periodic average, can be transmitted regarding each driver to their card or to the data-collecting unit in vehicle.

The driver of the vehicle can be identified in the vehicle also by means of the code or the object, whereat regarded as object is for instance driver's finger, eye or other part of his/hers body. Detectors that come into question are mounted in the control devices as occasion demands and acceleration detectors in different parts of the vehicle. Some detector data can be received from devices standard in the vehicle, such as anti-skid system.

The invention claimed is:

1. A method for identifying a driver who intends to drive a vehicle and for switching the vehicle between a driving-allowing mode or to a drive-stop mode, the method comprising the steps of:
   providing the vehicle with an ID scanner and with a control unit associated with said scanner,
   scanning of a personal ID of the driver by the scanner when the driver intends to drive the vehicle,
   switching the vehicle to the driving-allowing mode when the control unit recognizes the scanned personal ID of the driver;
   comparing with the control unit, when the driver is driving, actual driving data of the vehicle with driving style information of the driver; and
   on a basis of the comparison of the driving style information with the actual driving data, determining with the control unit in the vehicle either to continue to maintain the driving-allowing mode or to inform the driver that the vehicle will be switched to the drive-stop mode.

2. A method according to claim 1, wherein there are a plurality of possible vehicle drivers, and further including the initial step of issuing to each possible vehicle driver a respective personal ID object on which the respective driving style information in a normal situation is stored.

3. A method according to claim 1, wherein said comparing step includes receiving of information continuously during driving from selected vehicle devices and/or detectors by the control unit, and indicating to the driver by the control unit during situations deviating from normal driving of a possible switch to the drive-stop mode.

4. A method according to claim 1, further including the step of updating the driving style information of the driver as the driving style of the driver develops/changes.

5. A method according to claim 1, further including the steps of identifying by the control unit of road conditions during driving and adjusting of the driving style information accordingly.

6. A method according to claim 1, wherein the step of informing the driver of a switch to the drive-stop mode while driving includes switching on of an alarm system.

7. A method according to claim 1, further including the step of switching to or from the drive-stop mode by remote control.

8. A method according to claim 1, wherein said scanning step includes accepting by the control unit of only certain personal IDs to switch the vehicle to the allowing-driving mode, and sending by the control unit of alarm information when the control unit detects abnormal information scanned by the scanner.

9. A method according to claim 1, wherein said scanning step includes the inputting of a code.

10. A method according to claim 1, wherein said scanning step includes the scanning of a card.

11. A method according to claim 1, wherein said scanning step includes the scanning of a body part of the driver.

12. A method according to claim 1, wherein said scanning step includes the inputting of the personal ID which is carried by the driver.

13. A method according to claim 1, wherein said scanning step includes the inputting of information to the scanner which is recognized by the control unit.

14. A method according to claim 1, wherein said comparing step includes the storing of the driving style information in a data-collecting device of the vehicle.

15. A method according to claim 1, wherein said comparing step includes the storing of the driving style information in the personal ID.

16. A method according to claim 1, wherein said comparing step includes the receiving of actual driving data from selected vehicle controls of the vehicle.

17. A method according to claim 1, wherein said comparing step includes the receiving of actual driving data from information-collecting detectors of the vehicle.

18. A method to observe a driving style of a driver comprising the steps of:

provididing a driver information storage mechanism for the driver containing data according to the driving style of the driver;

providing the vehicle with a scanner which recognizes the driver and the driving style of the driver; and storing of further driving information data of the driver on the driver information storage mechanism when the driver starts driving, whereat the further driving information data is information received from selected controls of the vehicle and/or from information collecting detectors in the vehicle.

19. A method according to claim 18, further including the step of observing, on a basis of the further driving information data given by the detectors, how the driver treats the vehicle.

\* \* \* \* \*